(12) United States Patent  
Fang

(10) Patent No.: US 7,240,374 B2  
(45) Date of Patent: Jul. 10, 2007

(54) CAP STRUCTURE

(76) Inventor: Chiu-Hsiung Fang, No. 22, Lane 269, Sioushan Rd., Daya Township, Taichung County 428 (TW)

( * ) Notice: Subject to any disclaimer, the term of this patent is extended or adjusted under 35 U.S.C. 154(b) by 37 days.

(21) Appl. No.: 11/289,702

(22) Filed: Nov. 30, 2005

(65) Prior Publication Data

US 2007/0118972 A1     May 31, 2007

(51) Int. Cl.
*A42B 1/24* (2006.01)
(52) U.S. Cl. .............................. 2/209.13; 2/10; 351/155
(58) Field of Classification Search ................ 2/10, 2/12, 209.13; 351/155
See application file for complete search history.

(56) References Cited

U.S. PATENT DOCUMENTS

| 5,379,491 | A | * | 1/1995 | Solo | 24/3.3 |
| 5,544,361 | A | * | 8/1996 | Fine et al. | 2/10 |
| 6,174,058 | B1 | * | 1/2001 | Hsiao | 351/155 |
| 6,244,706 | B1 | * | 6/2001 | Maher | 351/155 |
| 6,935,741 | B2 | * | 8/2005 | Denney | 351/155 |
| 6,959,989 | B2 | * | 11/2005 | Holm | 351/155 |
| 2006/0037125 | A1 | * | 2/2006 | McDowell | 2/209.13 |

* cited by examiner

*Primary Examiner*—Katherine Moran
(74) *Attorney, Agent, or Firm*—Rosenberg, Klein & Lee

(57) ABSTRACT

A cap structure including a cap body, a glass and a connecting unit for connecting the cap body with the glass. The cap body has a peak section outward extending from a part of the periphery of the cap body. At least one magnetic member is movably inlaid in the peak section. The connecting unit includes a pivot seat and a pivot block pivotally connected with the pivot seat. At least one magnetic member is disposed in one end of the pivot seat opposite to the pivot block, whereby the magnetic member of the peak section and the magnetic member of the pivot seat can attract each other. The glass is fixedly connected with one end of the pivot block opposite to the pivot seat.

7 Claims, 6 Drawing Sheets

CAP STRUCTURE

BACKGROUND OF THE INVENTION

The present invention is related to a cap structure equipped with an adjustable glass.

FIG. 7 shows a peak cap having a peak 81 equipped with a glass 9. A block body 91 rides on upper edge of the glass 9. A magnet 92 is inlaid in the block body 91. Another magnet 82 is disposed under the peak 81. The magnet 82 can attract the magnet 92 to assemble the glass 9 with the peak 81. When not used, the glass 9 can be detached from the peak 81.

The magnet 82 is fixed under the peak 81 so that the position of the magnet 82 cannot be adjusted. Therefore, when the glass 9 is attracted by the magnet 82, the distance between the glass 9 and a user's eyes can be hardly adjusted as necessary. This leads to inconvenience in use of the peak cap.

Moreover, when a user detaches the glass 9 from the peak 81, the user often incautiously misses the glass 9.

SUMMARY OF THE INVENTION

It is therefore a primary object of the present invention to provide a cap structure equipped with a glass. The cap structure includes a connecting unit for pivotally connecting the cap body with the glass. The connecting unit can be fixed under a peak section of the cap body by means of magnetic attraction. Therefore, when wearing the cap, a user can also selectively use the glass. When not used, by means of the connecting unit, the glass can be turned upward and folded to attach to the bottom face of the peak section. Moreover, when not used, the glass is still connected with the cap body so that the glass is not easy to miss.

It is a further object of the present invention to provide the above cap structure in which a seat body is inlaid in the peak section. The seat body has slide channels in which magnets are slidably disposed. Therefore, when the glass is attracted under the peak section by means of the connecting unit, the glass can be moved back and forth to adjust the distance between the glass and a user's eyes.

The present invention can be best understood through the following description and accompanying drawings wherein:

DETAILED DESCRIPTION OF THE PREFERRED EMBODIMENTS

Figure 1:
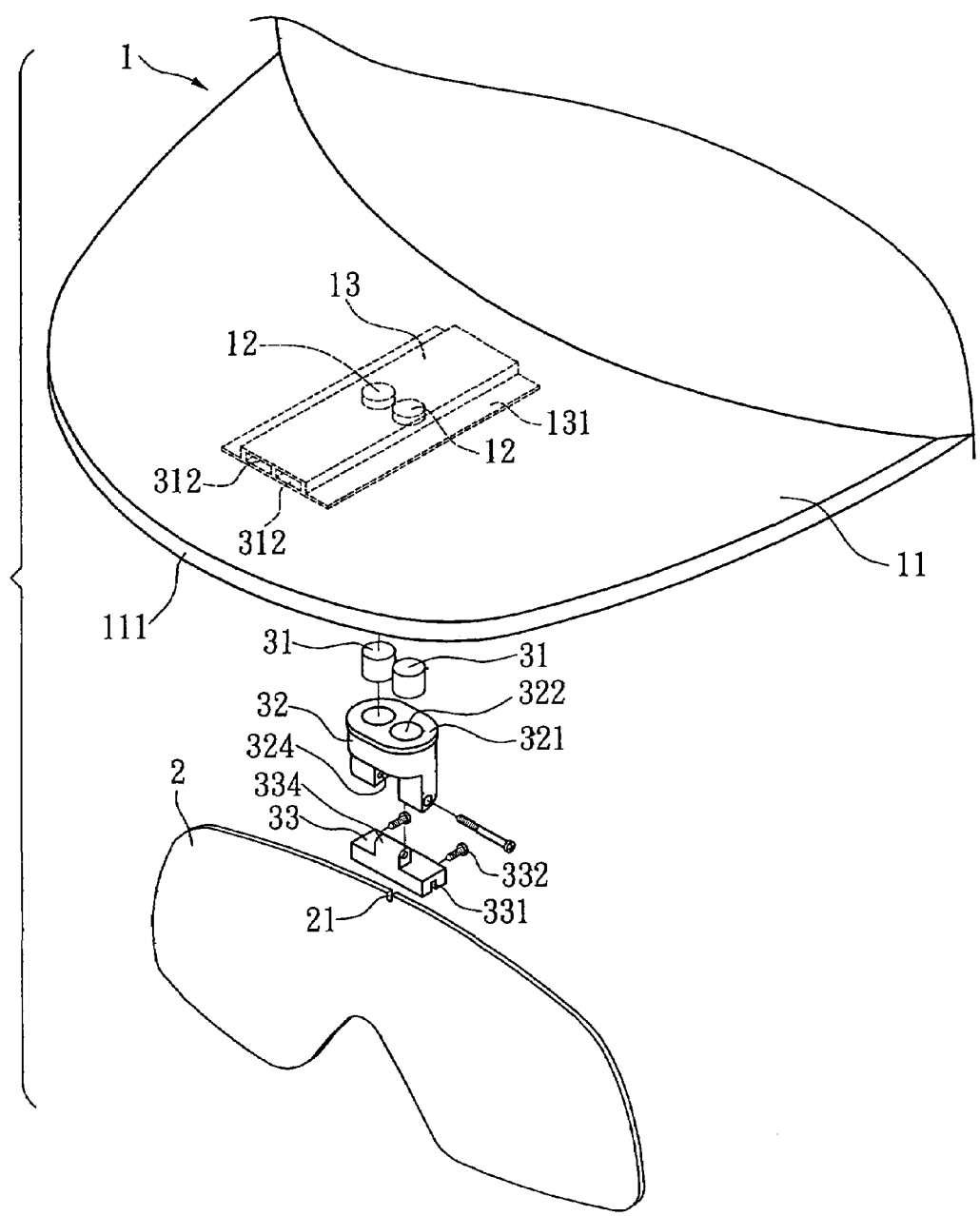
FIG. 1 is a perspective exploded view of the present invention.
Figure 2:
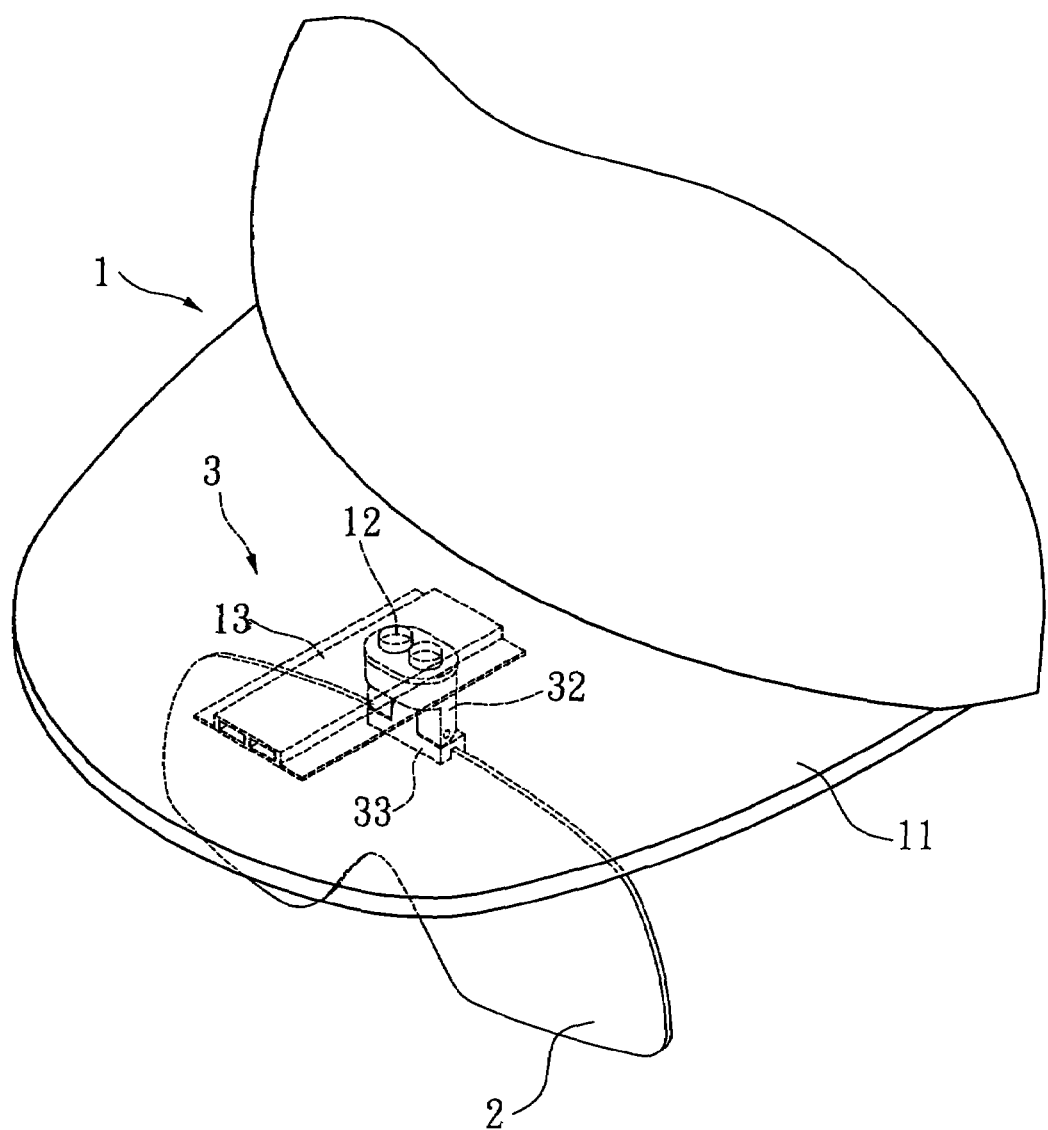
FIG. 2 is a perspective assembled view of the present invention.

Please refer to FIGS. 1 and 2. The cap structure of the present invention includes a cap body 1, a glass 2 and a connecting unit 3 for connecting the cap body 1 with the glass 2.

The cap body 1 has a peak section 11 outward extending from a part of the periphery of the cap body 1. A magnetic member 12 is inlaid in the peak section 11. The magnetic member 12 is movable toward a front edge 111 of the peak section 11. In this embodiment, the magnetic member 12 is a circular magnet. An elongated rectangular seat body 13 is embedded in the peak section 11. The seat body 12 has two wing sections 131 on two sides for sewing the seat body 13 in the peak section 11. The seat body 13 is formed with two internal slide channels 312. Two magnetic members 12 are respectively placed in the slide channels 312 and reciprocally slidable within the slide channels 312.

The connecting unit 3 includes a pivot seat 32 and a pivot block 33 pivotally connected with the pivot seat 32. Two magnetic members 31 are disposed in one end of the pivot seat 32 opposite to the pivot block 33, whereby the magnetic members 12 of the peak section 11 and the magnetic members 31 can attract each other. The glass 2 is fixedly connected with one end of the pivot block 33 opposite to the pivot seat 32.

In this embodiment, the magnetic members 31 are cylindrical magnetic bodies. The pivot seat 32 has a plane face 321 opposite to the pivot block 33. Two dents 322 are formed on the plane face 321, in which the magnetic members 31 are respectively fixedly accommodated. By means of the plane face 321, the magnetic members 12 of the peak section 11 and the magnetic members 31 can more firmly attract each other. The pivot seat 32 has a substantially U-shaped pivot-section 324 facing the pivot block 33.

The pivot block 33 has a substantially T-shaped pivot section 334 corresponding to the pivot section 324 of the pivot seat 32, whereby the pivot section 334 can be pivotally connected with the pivot section 324 of the pivot seat 32. In addition, one end of the pivot block 33 is formed with a groove 331 opposite to the pivot seat 32, in which an upper edge of the glass 2 is inlaid. Two screws 332 are perpendicularly screwed into the groove 331 to abut against the glass 2 to fix the glass 2 with the pivot block 33. By means of the pivot block 33, the glass 2 can be pivotally rotated relative to the pivot seat 32 and folded to a horizontal position under the peak section 11.

Figure 3:
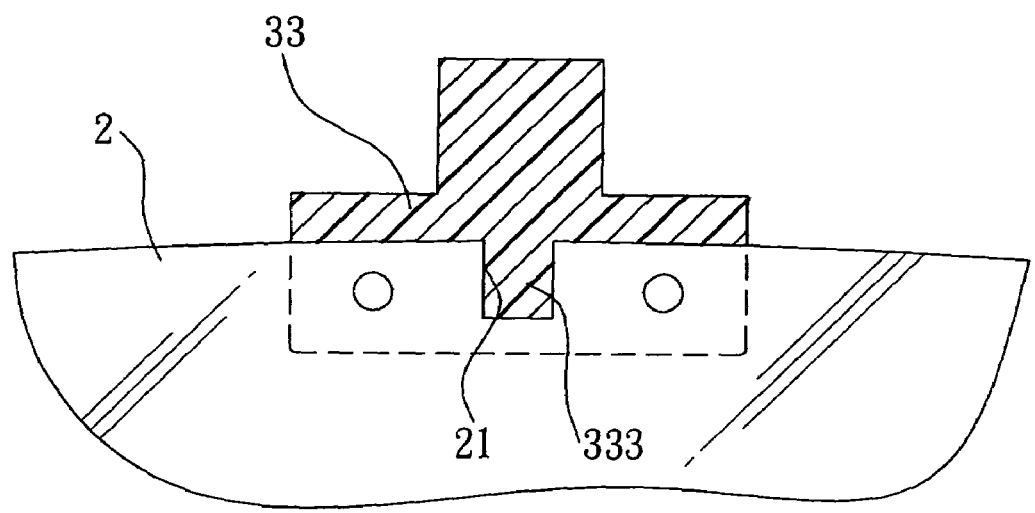
FIG. 3 is a sectional view showing that the glass is fixed with the pivot block of the connecting unit of the present invention.

In addition, referring to FIG. 3, the pivot block 33 has a boss 333 in the middle of the groove 331. The upper edge of the glass 2 is formed with a notch 21 corresponding to the boss 333. When the upper edge of the glass 2 is inlaid in the groove 331, the boss 333 is snugly fitted into the notch 21 to precisely locate the glass 2 on the pivot block 33 in a true position.

Figure 4:
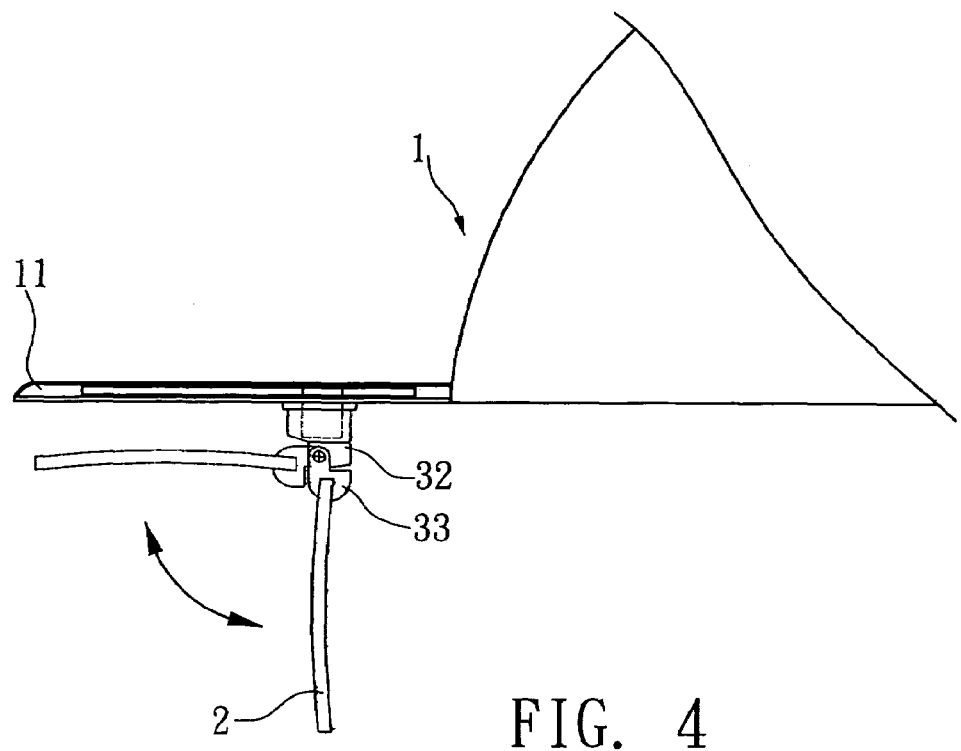
FIG. 4 is a side view showing that the glass of the present invention is turned upward and folded.
Figure 5:
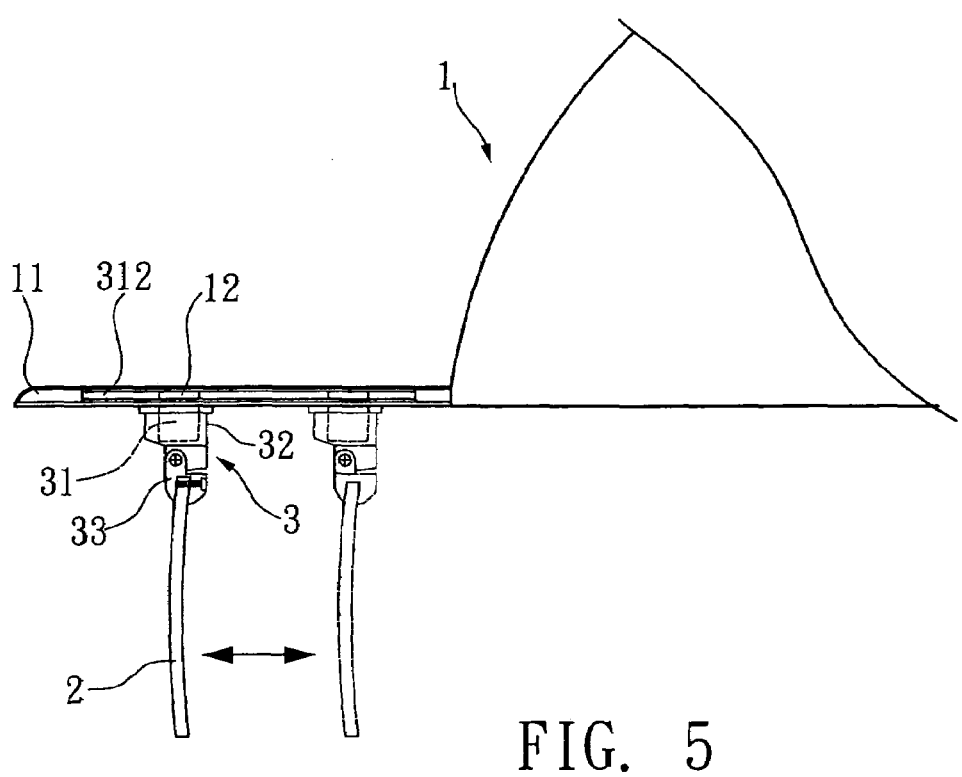
FIG. 5 is a side view showing that the glass of the present invention is moved back and forth.

The connecting unit 3 can be fixed under the peak section 11 of the cap body 1 by means of magnetic attraction. Therefore, the glass 2 is foldably located under the peak section 11. When wearing the cap, a user can also selectively use the glass 2. When not used, by means of the connecting unit 3, the glass 2 can be turned upward and folded to attach to the bottom face of the peak section 11 as shown in FIG. 4. When it is desired to use the glass 2 again, the glass 2 can be readily turned downward for use. This is quite convenient. Moreover, when not used, the glass 2 is still connected with the cap body 1 so that the glass 2 is not easy to miss.

Furthermore, the magnetic members 12 can be moved toward the edge 111 of the peak section 11. When the glass 2 is located under the peak section 11 by means of the connecting unit 3, the glass 2 can be moved back and forth to adjust the distance between the glass 2 and a user's eyes.

Figure 6:
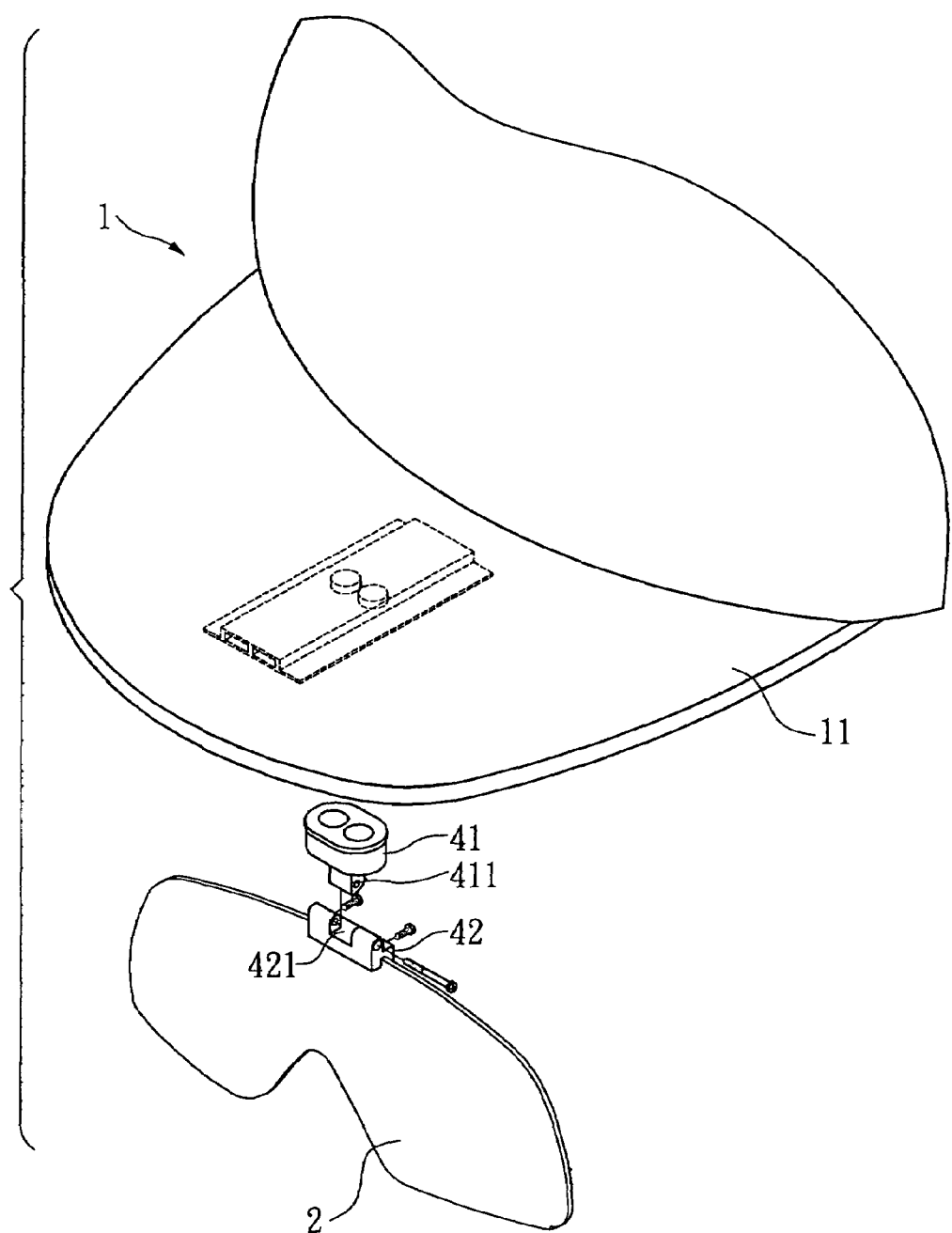
FIG. 6 is a perspective exploded view of a second embodiment of the present invention.
Figure 7:
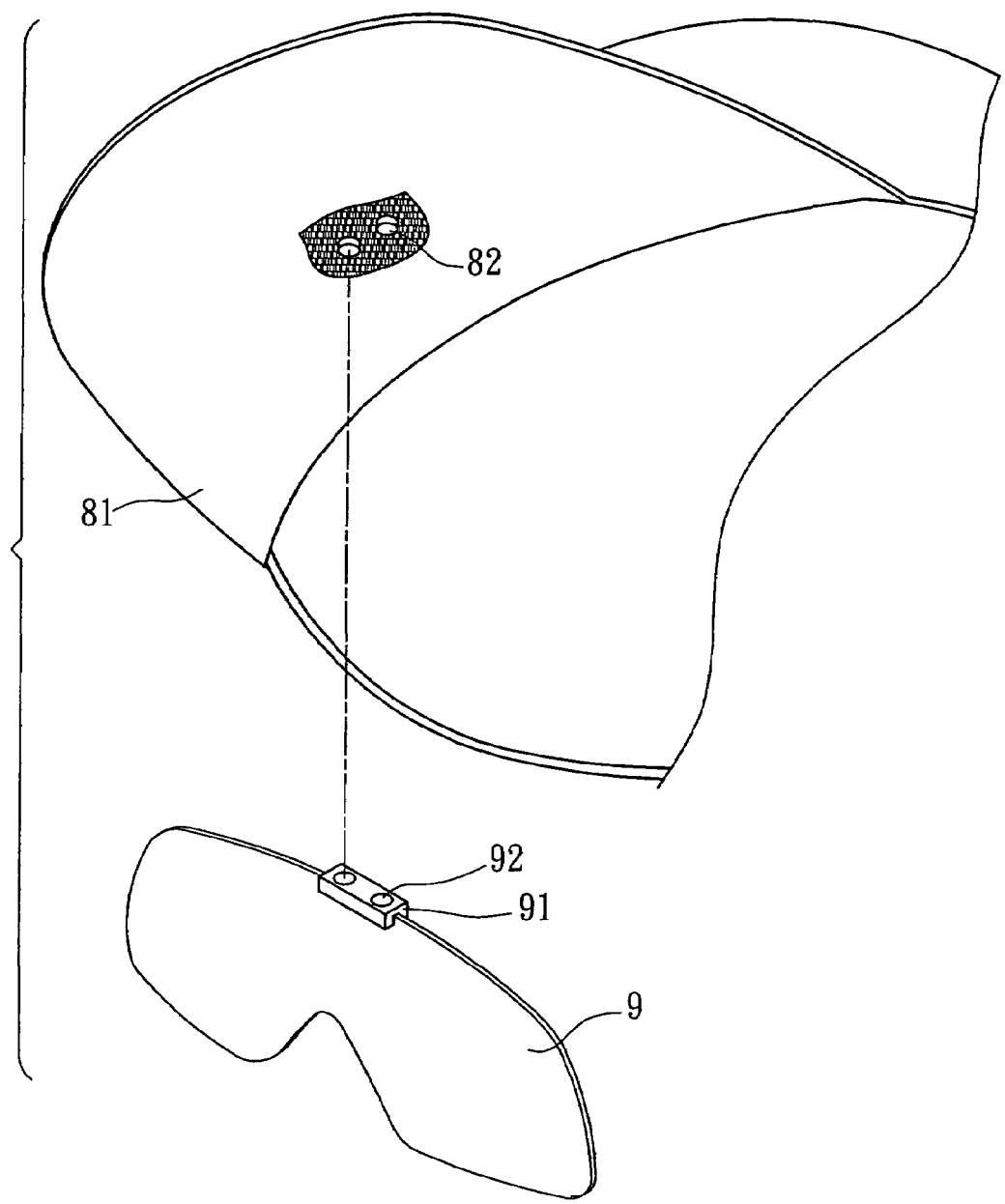
FIG. 7 shows a conventional peak cap equipped with a glass.

FIG. 6 shows a second embodiment of the present invention, which is operated in the same manner as the first embodiment. The only difference between the first and second embodiments is that the pivot seat 41 has a substantially T-shaped pivot section 411, while the pivot block 42 has a substantially U-shaped pivot section 421 corresponding to the pivot section 411 of the pivot seat 41. The pivot section 411 can be pivotally connected with the pivot section 421 to achieve the same effect as the first embodiment. The above embodiments are only used to illustrate the present invention, not intended to limit the scope thereof. Many modifications of the above embodiments can be made without departing from the spirit of the present invention.

What is claimed is:

1. A cap structure comprising a cap body, a glass and a connecting unit for connecting the cap body with the glass, wherein:

the cap body has a peak section outward extending from a part of the periphery of the cap body, at least one magnetic member being inlaid in the peak section, the magnetic member being movable toward a front edge of the peak section;

the connecting unit includes a pivot seat and a pivot block pivotally connected with the pivot seat, at least one magnetic member being disposed in one end of the pivot seat opposite to the pivot block, whereby the magnetic member of the peak section and the magnetic member of the pivot seat can attract each other; and the glass is fixedly connected with one end of the pivot block opposite to the pivot seat.

2. The cap structure as claimed in claim 1, wherein the magnetic member in the peak section is a circular magnet, an elongated rectangular seat body being embedded in the peak section, the seat body having two wing sections on two sides for sewing the seat body in the peak section, the seat body being formed with two internal slide channels, two magnetic members being respectively placed in the slide channels and reciprocally slidable within the slide channels.

3. The cap structure as claimed in claim 1, wherein the magnetic members of the pivot seat are cylindrical magnetic bodies, the pivot seat having a plane face opposite to the pivot block, two dents being formed on the plane face, in which the magnetic members of the pivot seat are respectively fixedly accommodated.

4. The cap structure as claimed in claim 3, wherein the pivot seat has a substantially U-shaped pivot section facing the pivot block and the pivot block has a substantially T-shaped pivot section corresponding to the pivot section of the pivot seat, whereby the pivot section of the pivot block can be pivotally connected with the pivot section of the pivot seat.

5. The cap structure as claimed in claim 3, wherein the pivot seat has a substantially T-shaped pivot section facing the pivot block and the pivot block has a substantially U-shaped pivot section corresponding to the pivot section of the pivot seat, whereby the pivot section of the pivot block can be pivotally connected with the pivot section of the pivot seat.

6. The cap structure as claimed in claim 1, wherein one end of the pivot block is formed with a groove opposite to the pivot seat, in which an upper edge of the glass is inlaid, at least one screw being perpendicularly screwed into the groove to abut against the glass to fix the glass with the pivot block.

7. The cap structure as claimed in claim 6, wherein the pivot block has a boss in the middle of the groove, the upper edge of the glass being formed with a notch corresponding to the boss, whereby when the upper edge of the glass is inlaid in the groove, the boss is snugly fitted into the notch.

* * * * *